US008249918B1

(12) United States Patent
Biere et al.

(10) Patent No.: US 8,249,918 B1
(45) Date of Patent: Aug. 21, 2012

(54) CONTEXT BASED CONTENT ADJACENCY FILTERING

(75) Inventors: Devon L. Biere, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 617 days.

(21) Appl. No.: 12/342,064

(22) Filed: Dec. 22, 2008

(51) Int. Cl.
*G06Q 30/00* (2006.01)
(52) U.S. Cl. ........................................................ 705/14
(58) Field of Classification Search .................... 705/14
See application file for complete search history.

(56) References Cited

U.S. PATENT DOCUMENTS

| 2007/0260520 | A1* | 11/2007 | Jha et al. .......................... 705/14 |
| 2009/0187486 | A1* | 7/2009 | Lefenfeld et al. ................ 705/14 |
| 2009/0320059 | A1* | 12/2009 | Bolyukh .......................... 725/32 |
| 2010/0042470 | A1* | 2/2010 | Chang et al. .................... 705/10 |

* cited by examiner

*Primary Examiner* — Alvin L Brown

(57) ABSTRACT

A method of delivering advertisements with media content using context based filtering is provided. The method comprises copying a unit of media content and then accessing a first advertisement wherein the first advertisement comprises a first advertisement content and a context based filtering criteria. The method also comprises examining the copied unit of media content using the context based filtering criteria and when the copied unit of media content conflicts with the context based filtering criteria, the copied unit of media content is delivered without the first advertisement content. When the copied unit of media content does not conflict with the context based filtering criteria, the copied unit of media content is delivered with the first advertisement content.

17 Claims, 7 Drawing Sheets

CONTEXT BASED CONTENT ADJACENCY FILTERING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising on Internet websites has become a popular method of advertising. In addition, website publishers can generate additional income by allowing advertisements to appear with their web pages. Currently, when a web browser is used to display and interact with text on a web page, the Internet service provider may connect with the website, which may request an advertisement from an ad server. The ad server, which stores advertisements sent from advertising agencies, may select an advertisement and an image to present to the computer user.

To target specific customer types, advertisers may specify a uniform resource locator (URL) on which to post an advertisement, or may just allow their advertisement to be posted on any webpage. A web crawler (a.k.a. web spider) is a type of software program that methodically browses the Internet to gather information. The web crawler may obtain data that can be indexed later by a search engine to speed up web searches.

SUMMARY

In an embodiment, a method of delivering advertisements with media content using context based filtering is provided. The method comprises copying a unit of media content and then accessing a first advertisement wherein the first advertisement comprises a first advertisement content and a context based filtering criteria. The method also comprises examining the copied unit of media content using the context based filtering criteria and when the copied unit of media content conflicts with the context based filtering criteria, the copied unit of media content is delivered without the first advertisement content. When the copied unit of media content does not conflict with the context based filtering criteria, the copied unit of media content is delivered with the first advertisement content.

In another embodiment, a method of delivering advertisements with media content using context based filtering is provided. The method comprises copying a unit of media content and then accessing both a first advertisement and a second advertisement wherein the first advertisement comprises a first advertisement content and a context based filtering criteria and the second advertisement comprises a second advertisement content. The method also comprises examining the copied unit of media content using the context based filtering criteria and when the copied unit of media content conflicts with the context based filtering criteria, the copied unit of media content is delivered with the second advertisement content. When the copied unit of media content does not conflict with the context based filtering criteria, the copied unit of media content is delivered with the first advertisement content.

In another embodiment, a system for delivering advertisements with media content based on advertisement campaign rules is disclosed. The method comprises a computer system, an advertisement campaign rules database that contains a plurality of advertisement campaign rules, and an application. The application, when executed on the computer system, receives a page comprised of a media content and an advertisement. The application evaluates the media content based on one of the advertisement campaign rules, wherein the advertisement campaign rule is retrieved from the advertisement campaign rules database based on the advertisement. When the media content violates the advertisement campaign rule, the application removes the advertisement from the page, and transmits the page.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
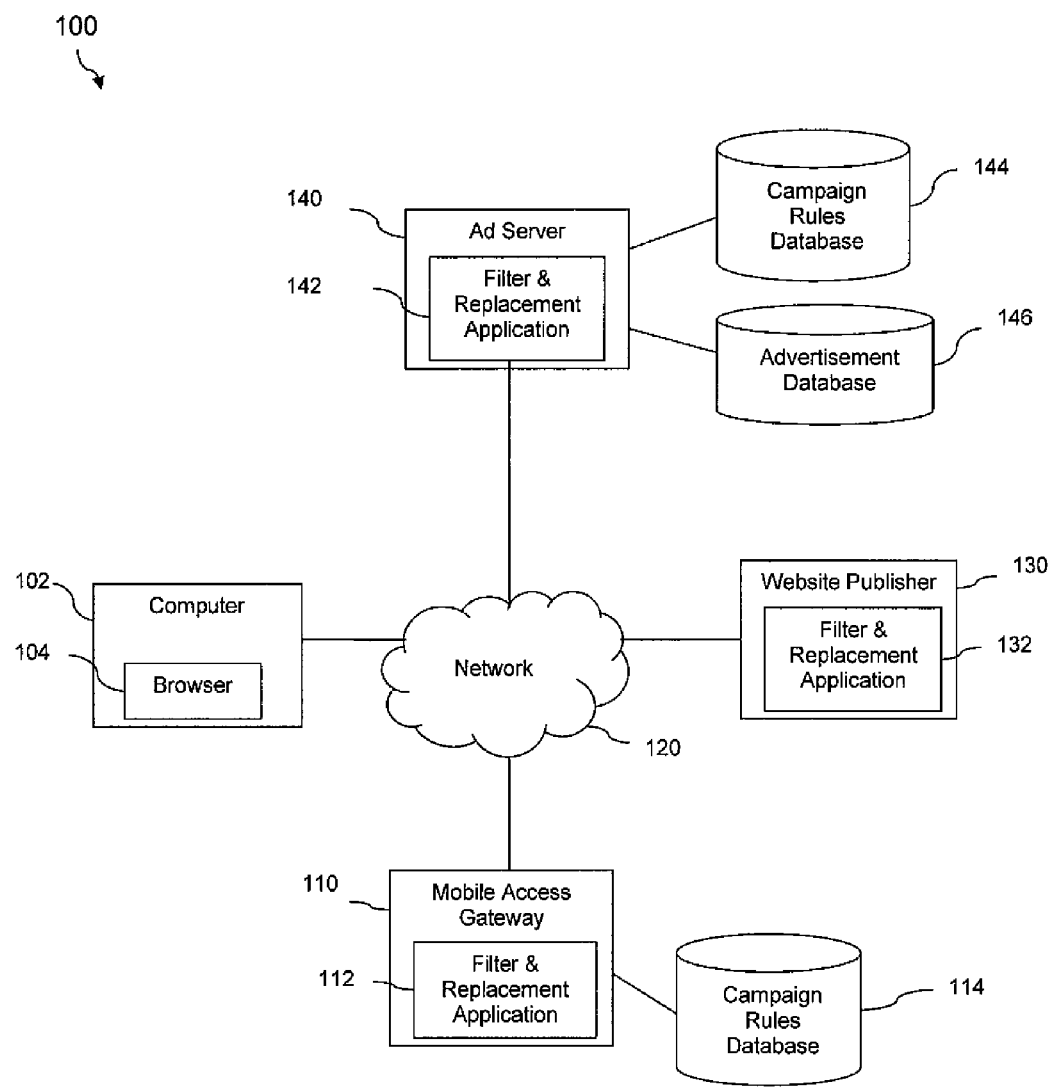
FIG. 1 illustrates a system for delivering advertisements with media content according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A system and method to deliver advertisements with media content using context based filtering is disclosed. In an embodiment, when a computer browser (e.g., Internet Explorer, Safari, Netscape) is used to access a web page, the website may communicate with an ad server to obtain an advertisement to serve with the web page. A filter and replacement application can be implemented to examine the content of the web page to determine if it meets the criteria specified by an advertiser. For example, a company that sells religious books may not want their advertisement to appear on a pornographic web page. In another example, a politician may not want a campaign advertisement to appear when a terrorist website is visited. Advertisers may be willing to pay more if they can be assured that their message appears in the context of appropriate content. Advertisers may also be willing to pay more if they can target their advertising to customers, based on the criteria. The targeting may be based on the inference that a particular kind of website or content is more likely to be browsed by a desired demographic or audience.

In an embodiment, each advertiser may have a set of campaign rules for each individual advertisement or for all of their advertisements that they send out to websites. The campaign rules may define the type of customer that they want to target based on demographics and/or may also include restrictions that define any types of keywords or context that they want to exclude because of an offensive content or a negative connotation (e.g., terrorist, politics, pornography, competitors). When the computer browser accesses a web page and the ad server selects an advertisement, the filter and replacement application can examine the embedded content of a copy of the web page and analyze it in conjunction with the campaign rules established for the selected advertisement. If the copy of the web page content contains a violation of the campaign rules, the selected advertisement will not be served with the copy of the web page. Depending on how and where the filtering and replacement process is set up, the copy of the web page may be sent back to the browser without an advertisement or a second advertisement, for example an advertisement associated with a more relaxed campaign rules or no rules, may be served with the copy of the web page. In an embodiment, an advertiser that provides the second advertisement without context restrictions or with relaxed context restrictions may pay a lower fee than an advertiser that wants to restrict the context in which to advertise. In addition, if an advertisement is suppressed due to conflicting web page content and another advertisement is sent instead, a notification may be sent to inform the ad server of which advertisement was sent so that the advertiser can be billed accordingly.

One or more methods may be implemented to filter web page content. In one embodiment, the web page content may be examined and filtered at the mobile access gateway (MAG). The internet service provider (ISP) may operate the mobile access gateway to provide access to various internet services. In this scenario, when a computer browser requests a web page and the ad server selects and transmits an advertisement, the filter and replacement application at the mobile access gateway examines the web page content and the campaign rules assigned to the advertisement to determine if the advertisement can be rendered to the computer browser. If the web page content conflicts with the advertisement, the advertisement is removed from the web page and the web page is sent without an advertisement. Alternatively, a second advertisement, that does not contain restrictions, may be sent with the web page in place of the first advertisement. The ad server may be subsequently informed of any advertisements that were sent or suppressed.

In another embodiment, the filter and replacement application may execute at the website publisher. In this scenario, when a computer browser requests a web page, the ad server selects and sends the advertisement and its associated campaign rules information to the website publisher which is where the web page content resides. The filter and replacement application at the website publisher examines the copy of the web page content and the campaign rules assigned to the advertisement to determine if the advertisement can be rendered to the computer browser. If no conflict exists, the advertisement is stitched into the copy of the web page content and displayed to the computer browser. If the copy of the web page content conflicts with the advertisement, the copy of the web page is sent without an advertisement. Alternatively, a second advertisement, that does not contain restrictions, may be sent with the copy of the web page in place of the first advertisement. The ad server may be subsequently informed of any advertisements that were sent or suppressed.

In another embodiment, the ad filter and replacement application may execute at the ad server. In this scenario, the ad server itself would perform the filtering and replacement based on campaign rules for an advertisement. When the computer browser selects a web page, the website publisher may send a stripped down copy (i.e., without the graphics) or a full copy of the web page content to the ad server. Alternatively, the ad server may retrieve the requesting page from the website publisher to pull out the content of the webpage. The ad server then selects an advertisement and uses the filter and replacement application to compare the web page content to the campaign rules assigned to the advertisement, to determine if the advertisement can be rendered to the computer browser. If the web page content conflicts with the advertisement, a second advertisement, that does not contain restrictions, may be sent with the web page in place of the first advertisement. The ad server is then responsible for delivering and tracking the advertisement.

Turning now to FIG. 1, a system 100 for delivering advertisements with media content based on advertising campaign rules or context criteria is disclosed. The system 100 comprises a network 120, a computer 102 that contains a browser 104, a mobile access gateway (MAG) 110, a website publisher 130, an ad server 140, a filter and replacement application 112, 132, 142, a campaign rules database 114, 144, and an advertisement database 146. The computer 102 may be implemented as a general purpose computer system. General purpose computers are discussed in detail hereinafter. The browser 104 is used to access, display, and interact with images and other information on a web page. The mobile access gateway 110 could also be referred to as an internet service provider (ISP) or a forward proxy and is generally the link between the browser 104 and the website publisher 130. The ad server 140 may store advertisements in the advertisement database 146. The advertisements are sent from advertising agencies that may pay to have their advertisement appear on web pages. The website publisher 130 provides access to a content webpage. Accessing a content webpage may be referred to herein as copying the content and/or webpage. In some contexts, the website publisher 130 may be referred to as a website and/or as a content server. The campaign rules databases 114 and 144 may be associated with the ad server 140 or the mobile access gateway 110 and may contain rules for each advertisement or each advertiser that define the type of customer to target based on demographics and may include restrictions that define context or keywords to exclude. The filter and replacement application 112, 132, 142 may execute at one of the mobile access gateway 110, the website publisher 130, and the ad server 140. The filter and replacement application 112, 132, 142 analyzes the copy of the web page content and the campaign rules and/or metadata coupled to the advertisement, to determine if the advertisement may be associated with a copy of the web page or if a replacement advertisement should be sent. In an embodiment, content contextual criteria and/or restrictions may be defined in metadata which is coupled to the advertisements stored at the ad server 140. The computer 102, the ad server 140, the mobile access gateway 110, and the website publisher 130 may all communicate through the network 120.

In some other systems, content distributed across many website publishers 130 may be continuously crawled through, analyzing content item by content item, to determine suitability of the content. Because of the mass of public content, however, a time lag may exist between the determination of content suitability and a subsequent access to the public content. During this time lag, the public content may change—for example, a BLOG may publish new content of an offensive nature to some advertisers. A system that crawls through and analyzes all public content on a weekly basis may fail to prevent an advertisement of a car manufacturer from be presented in the context of a BLOG that has posted a discussion thread yesterday that is hostile to the specific car manufacturer. In the disclosed system, however, the specific content that is copied for access is analyzed with reference to criteria defining suitable context before the subject advertisement is stitched into the accessed content, thus no time lag may develop between the analysis and the access to the content.

In an embodiment, when the computer browser 104 (e.g., Netscape, Internet Explorer, Firefox, Safari) requests a web page, the website publisher 130 may send a copy of the web page content to the ad server 140. The ad server 140 may select an advertisement from the advertisement database 146 and send it to the website publisher 130. The website publisher 130 may then stitch the advertisement into the copy of the webpage content. In an embodiment, stitching involves embedding markup language start and end tags associated with advertisements as well as adding text of advertisements and possibly embedded images and/or links to other content. The copy of the webpage content may comprise a first file in one of a hyper text markup language (HTML) format, a wireless markup language (WML) format, a handheld device markup language (HDML) format, and an extensible markup language (XML) format. In embodiment, the copy of the webpage content may be provided in a real simple syndication (RSS) feed format. The results of the stitching may be said to result in a second file in one of hyper text markup language format, wireless markup language format, handheld device markup language format, extensible markup language format, or real simple syndication format.

The filter and replacement application 112, 132, 142 examines the copy of the webpage content to determine if it is in conflict with the campaign rules stored in the campaign rules database 114,144 for the embedded advertisement and/or in conflict with the content context criteria and/or restrictions contained in metadata coupled to the advertisement.

In an embodiment, the campaign rules database 114,144 may contain a set of campaign rules for each advertisement or for each advertiser that define the types of keywords and/or contexts to include and may define keywords or contexts to exclude. In some cases, the advertiser may not want their advertisement to be presented in the context of a website that may have objectionable content. For example, a company that wants to project a family oriented image may not want to advertise in the context of a web page containing pornographic or terrorist content. The ad filter and replacement application 112, 132, 142 can examine the copy of the web page content and analyze it in conjunction with the campaign rules established for the advertisement, to determine if the content on the copy of the web page is a suitable context for presenting the advertisement. If the copy of the web page contains content that is a violation of the campaign rules, the advertisement is suppressed. Depending on how the ad server 140 is set up to select advertisements, the copy of the web page may be sent back to the browser 104 with no advertisement, or it may have a second advertisement ready that it can serve with the copy of the web page as a replacement. The replacement advertisement may be from an advertiser that is willing to let their advertisement appear on any web page, without any restrictions. In an embodiment, the company that provides the replacement advertisement may pay a lower fee than a company that wants to filter the contextual content of websites on which to advertise.

Figure 2:
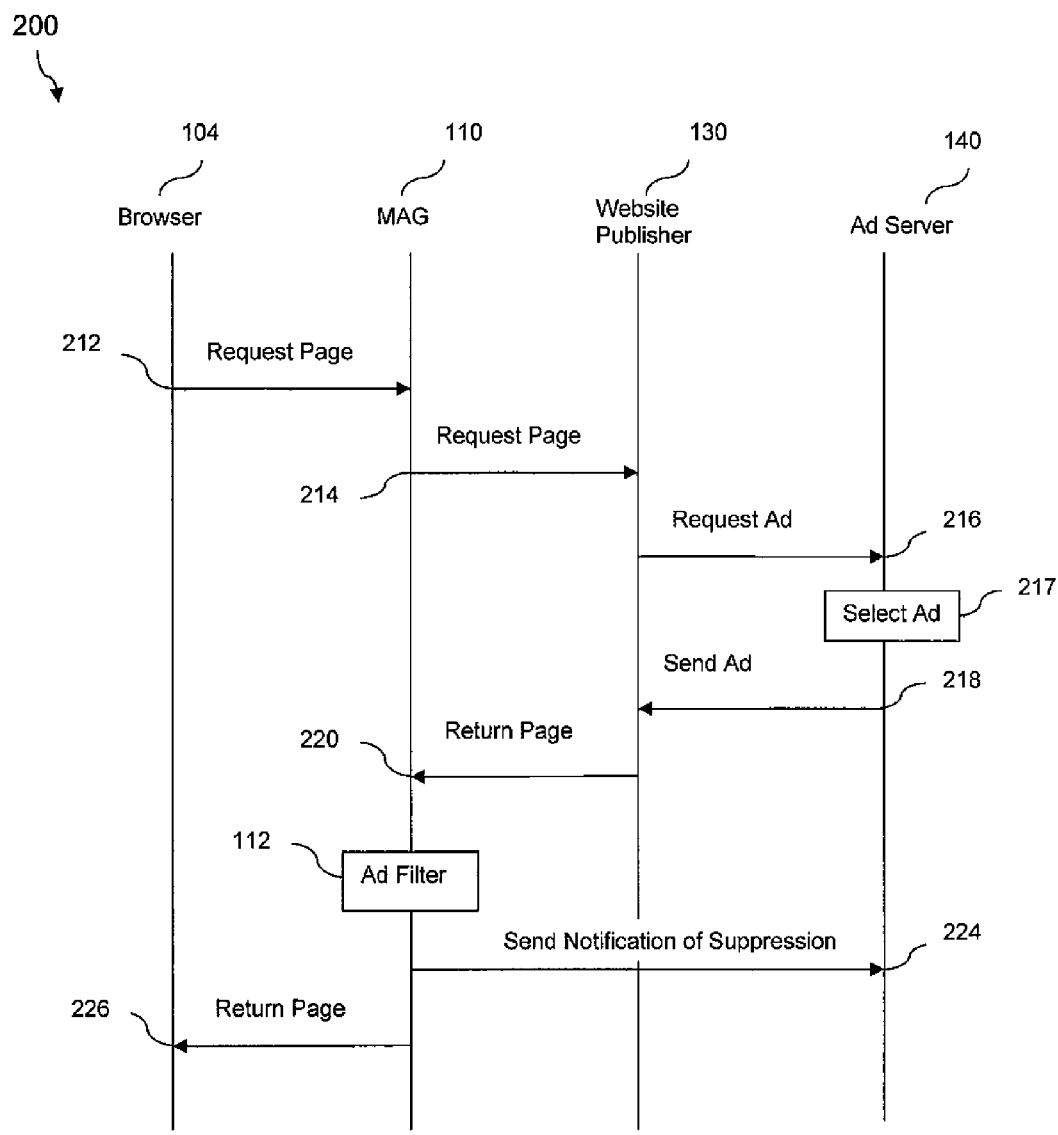
FIG. 2 is a message sequence diagram for filtering advertisements at a mobile access gateway (MAG) according to an embodiment of the disclosure.

Turning now to FIG. 2, a message sequence 200 is described. The sequence 200 begins with the browser 104 that in message 212, requests a web page from the mobile access gateway 110, which serves as a link between the browser 104 and the website publisher 130. In message 214, the mobile access gateway 110 requests the web page from the website publisher 130. In message 216, the website publisher 130 requests an advertisement from the ad server 140. In block 217, the ad server 140 selects an advertisement from the advertisement database 146. Then in message 218, the ad server 140 sends the advertisement back to the website publisher 130 where the selected advertisement is stitched into a copy of the webpage content. In message 220, the website publisher 130 returns the copy of the web page content and the embedded advertisement to the mobile access gateway 110. The filter and replacement application 112 at the mobile access gateway 110 may analyze the copy of the web page content to determine if it is in conflict with the campaign rules assigned to the embedded advertisement. If no conflict exists, the sequence proceeds to message 226 in which the mobile access gateway 110 sends the copy of web page content and the embedded advertisement to display to the browser 104.

If the ad filter and replacement application 112 at the mobile access gateway 110 determines that the copy of the web page content conflicts with the rules for the advertisement, the advertisement is suppressed and the copy of the web page may be sent to the browser 104 without an advertisement. Alternatively, depending on how the ad server 140 is set up to select ads, in message 218, two advertisements may be sent from the ad server 140 including a second advertisement without context restrictions. If the first advertisement is suppressed due to conflicting content, the second advertisement may be sent with the copy of the web page content. In message 224, the mobile access gateway 110 may notify the ad server 140 if an advertisement was suppressed due to conflicting content. In message 226, the mobile access gateway 110 sends a copy of the requested web page, along with the selected embedded advertisement, to display to the browser 104.

Figure 3:
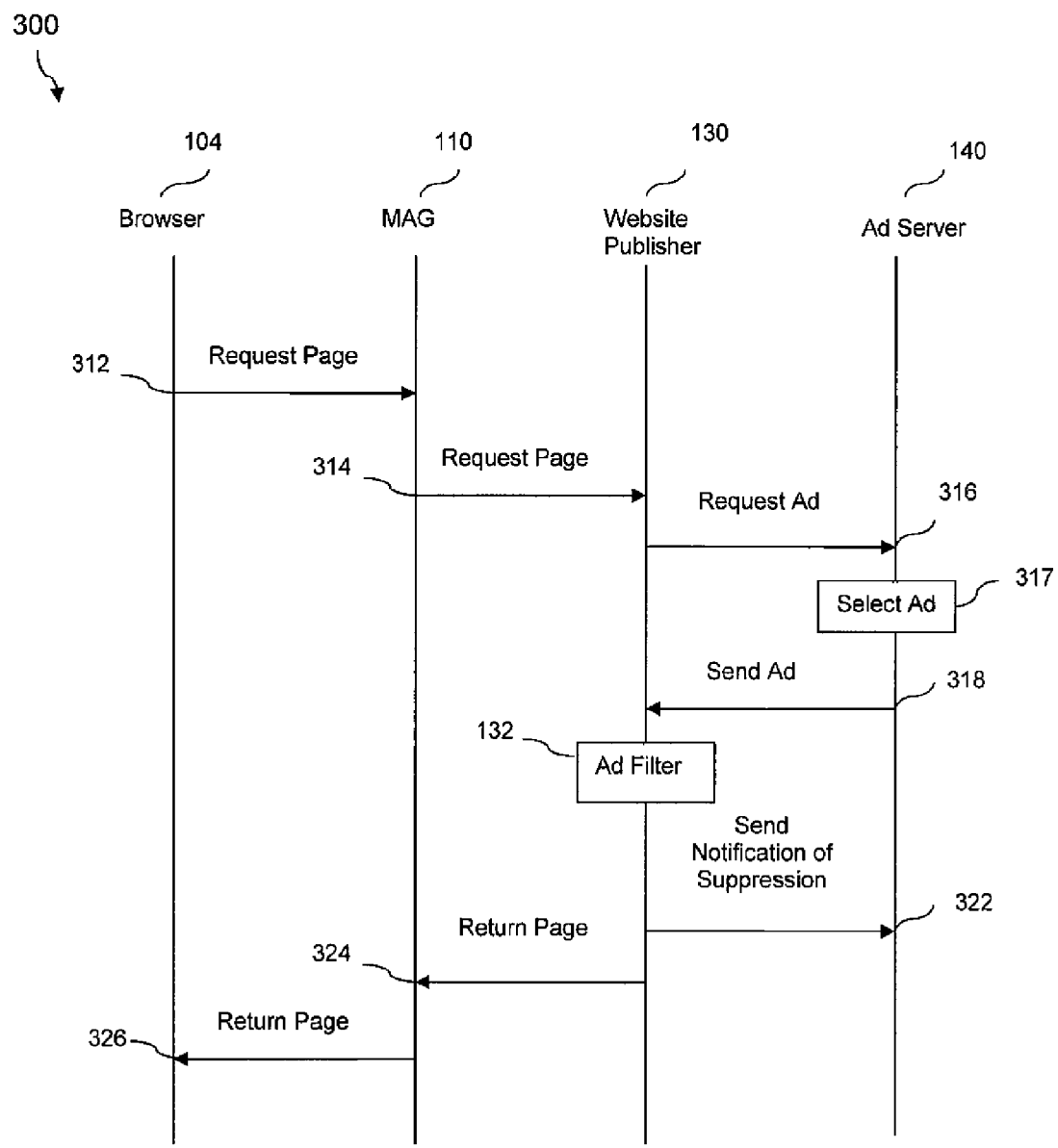
FIG. 3 is a message sequence diagram for filtering advertisements at a website publisher according to an embodiment of the disclosure.

Turning now to FIG. 3, a message sequence 300 is described. The sequence 300 begins with the browser 104 that in message 312, requests a web page from the mobile access gateway 110, which serves as a link between the browser 104 and the website publisher 130. In message 314, the mobile access gateway 110 requests the web page from the website publisher 130. In message 316, the website publisher 130 requests an advertisement from the ad server 140, to be served with the web page content. In block 317, the ad server 140 selects an advertisement from the advertisement database 146 along with any associated filtering criteria from the campaign rules database 144. In message 318, the ad server 140 transmits the selected advertisement and its associated campaign rules to the website publisher 130. The ad filter and replacement application 132 at the website publisher 130 may analyze the web page content to determine if it is in conflict with the campaign rules assigned to the advertisement. If no conflict exists, the website publisher 130 stitches the advertisement into a copy of the webpage content. In message 324, the website publisher returns the copy of the web page content and the embedded advertisement to the mobile access gateway 110. Then in message 326, the mobile access gateway 110 sends the copy of the web page with the embedded advertisement to display to the browser 104.

If the ad filter and replacement application 132 at the website publisher 130 determines that the copy of the web page content conflicts with the advertisement, the copy of the web page content may be sent without an advertisement. Alternatively, depending on how the ad server 140 is set up to select ads, in message 318, two advertisements may be sent from the ad server 140, including a second advertisement with no context restrictions. If the first advertisement is suppressed due to conflicting content, the second advertisement may be sent with the web page to replace the first advertisement. In message 322, the website publisher 130 may notify the ad server 140 if an advertisement was suppressed due to conflicting content. In message 324, the website publisher 130 sends the selected appropriate advertisement, if applicable, with the requested copy of the web page to the mobile access gateway 110. In message 326, the mobile access gateway 110 sends the copy of the web page and the embedded advertisement to display to the browser 104.

Figure 4:
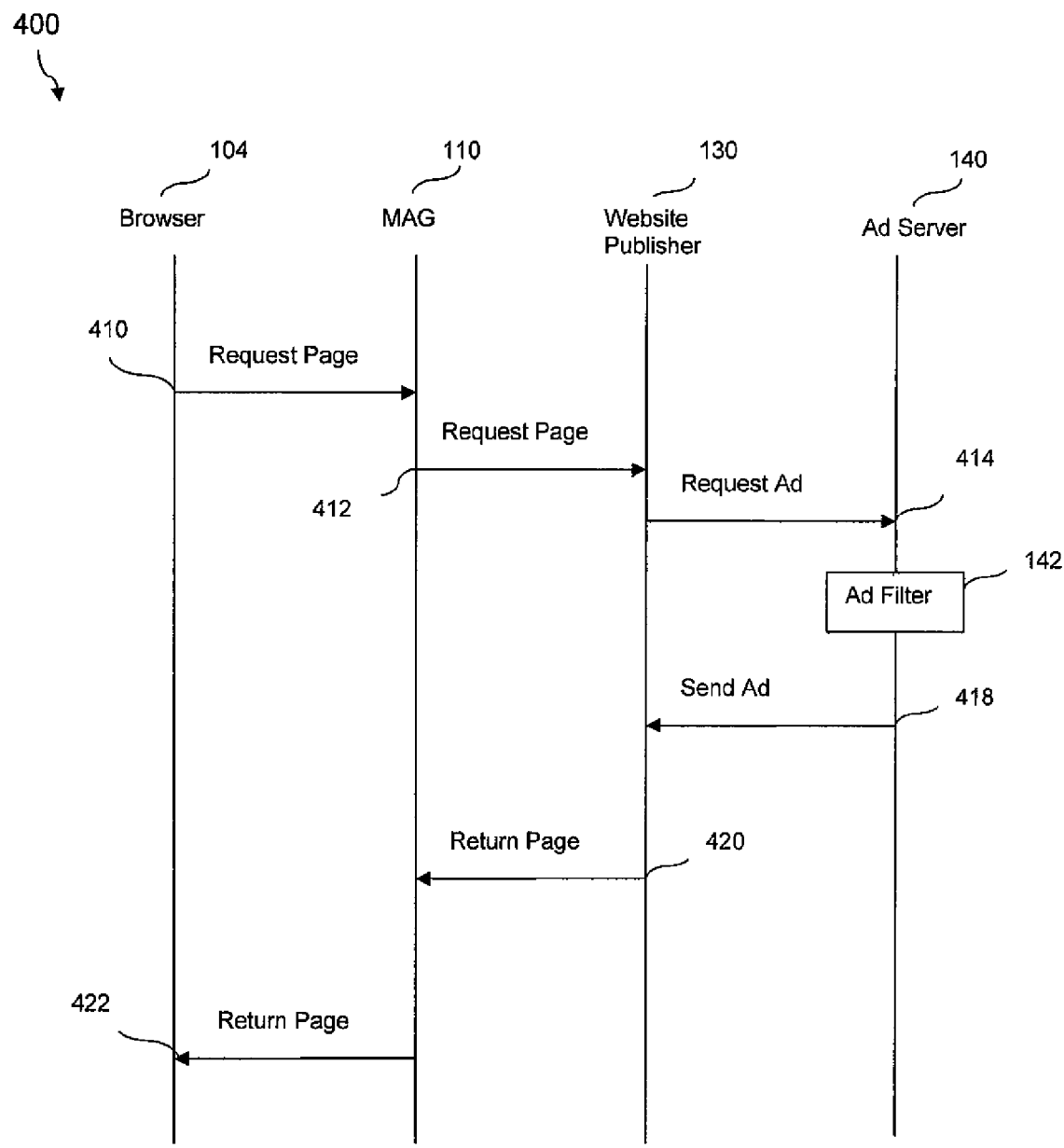
FIG. 4 is a message sequence diagram for filtering advertisements at an ad server according to an embodiment of the disclosure.

Turning now to FIG. 4, a message sequence 400 is described. The sequence 400 begins with the browser 104 that in message 410, requests a web page from the mobile access gateway 110, which serves as a link between the browser 104 and the website publisher 130. In message 412, the mobile access gateway 110 requests the web page from the website publisher 130. In message 414, the website publisher 130 sends either a stripped down copy (i.e., without the graphics) or a full copy of the page content to the ad server 140. Alternatively in message 414, the ad server 140 may retrieve a copy of the web page from the website publisher 130 to access the content of the webpage. The ad server 140 then selects an advertisement from the advertising database 146 and uses the filter and replacement application 142 to analyze the copy of the web page content to determine if it is in conflict with the campaign rules assigned to the advertisement in the campaign rules database 144. If no conflict exists, the sequence proceeds to message 418 in which the ad server returns the copy of the web page content to the website publisher 130. The website publisher stitches the advertisement into the copy of the web page. In message 420, the website publisher returns the copy of the web page content with the embedded advertisement to the mobile access gateway 110. In message 422, the mobile access gateway 110 returns the copy of the web page with the embedded advertisement to display to the browser 104.

If the ad filter and replacement application 142 at the ad server 140 determines that the copy of the web page content conflicts with the advertisement, the advertisement is suppressed. Alternatively, a second advertisement that does not contain restrictions may be sent with the copy of the web page content. In message 418, the selected advertisement is sent to the website publisher 130 where the advertisement is stitched into the copy of the web page content. In message 420, the webpage and embedded advertisement may be sent to the mobile access gateway 110, which in message 422, sends the copy of the web page content and the embedded advertisement to display to the browser 104.

Figure 5:
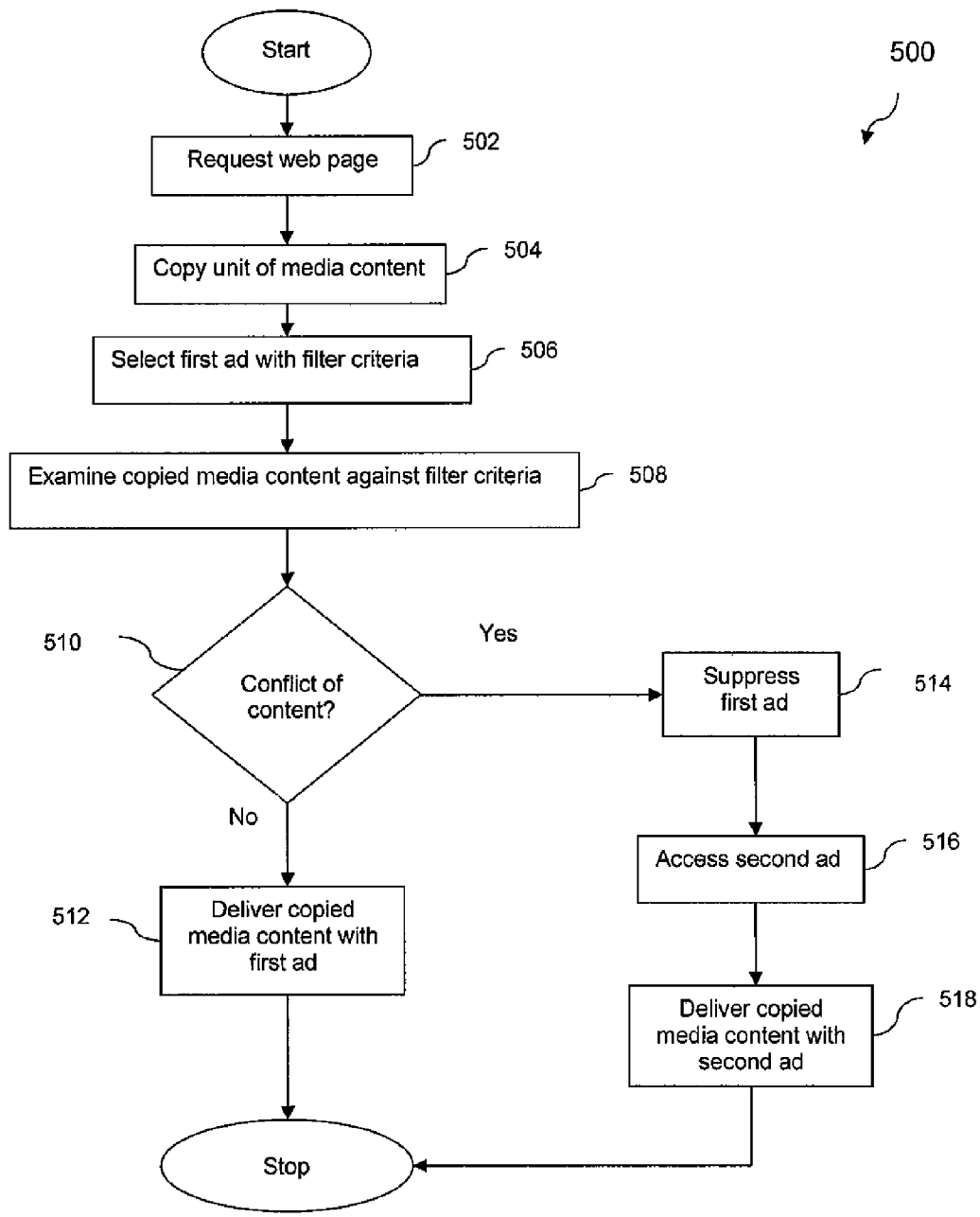
FIG. 5 is a flow chart of a method of delivering advertisements according to an embodiment of the disclosure.

Turning now to FIG. 5, a method 500 of delivering advertisements with media content using context based filtering is described. The method 500 begins at block 502 where the browser 104 on the computer 102 is used to request a web page, through the mobile access gateway 110, from the website publisher 130. In block 504, a unit of media content is copied from the web page. In block 506, the ad server 140 selects a first advertisement from the advertisement database 146. In an embodiment, the first advertisement may contain a set of campaign rules set up in the campaign rules database 114, 144 that restrict the first advertisement from being embedded in any web pages that contain objectionable content (e.g., objectionable moral content, objectionable product content, objectionable competitor content, and objectionable political content). For example, a company may not want their advertisements to be presented in the context of a webpage for a terrorist organization or an opposing political campaign.

The company may define objectionable political content to comprise text, music, and/or images advocating, condoning, and/or depicting terrorist acts and/or terroristic ideology to be objectionable political content. Similarly, the company may define objectionable moral content to comprise text, music, and/or images advocating, condoning, and/or depicting specific actions the company deems morally objectionable. The company may define objectionable competitor content to be advertisements, text, music, and/or images related to any product offered by a competitor. The company may define objectionable product content to be advertisements, text, music, and/or images related to a product offered by a competitor and/or a product that does not comport with one or more products and/or the image the company desires to project. For example, a company that promotes and supports wellness initiatives may not want to present their advertisement in the context of access to a web page of a whisky manufacturer. A company that promotes and supports products for youths may not want to present their advertisement in the context of access to a web page for retired people. While a few examples have been provided, it is understood that a very wide variety of definition of objectionable content is possible and contemplated by the present disclosure.

In block 508, the filter and replacement application 112, 132, or 142 may analyze the copied unit of media content for specific keywords and/or context and compare the results to the campaign rules set up for the first advertisement in the campaign rules database 114, 144. In block 510, it is determined if the copy of media content conflicts with any rules established for the advertisement. If in block 510, the filter and replacement application 112, 132, 142 does not find any data in the copied unit of media content that conflicts with the filtering restrictions for the first advertisement campaign, the method moves to bock 512 where the first advertisement is displayed on the browser 104 with the copy of media content.

If in block 510, the filter and replacement application 112, 132, 142 determines that the copy of the content of the media content has keywords that conflict with the campaign rules set up for the first advertisement (e.g., the advertiser does not want to advertise on a competitors website), the method moves to block 514 where the first advertisement is suppressed and the copy of the web page is delivered without an advertisement. Optionally, the method 500 may proceed to block 516 where a second advertisement is obtained from the ad server 140. The second advertisement may not contain any restrictions and can be delivered with any media content. In an embodiment, the company that provides the replacement advertisement may pay a lower fee than a company that wants to restrict the websites on which to advertise. Proceeding to block 518, the second advertisement is embedded into the copy of the media content and delivered to the browser 104.

Figure 6:
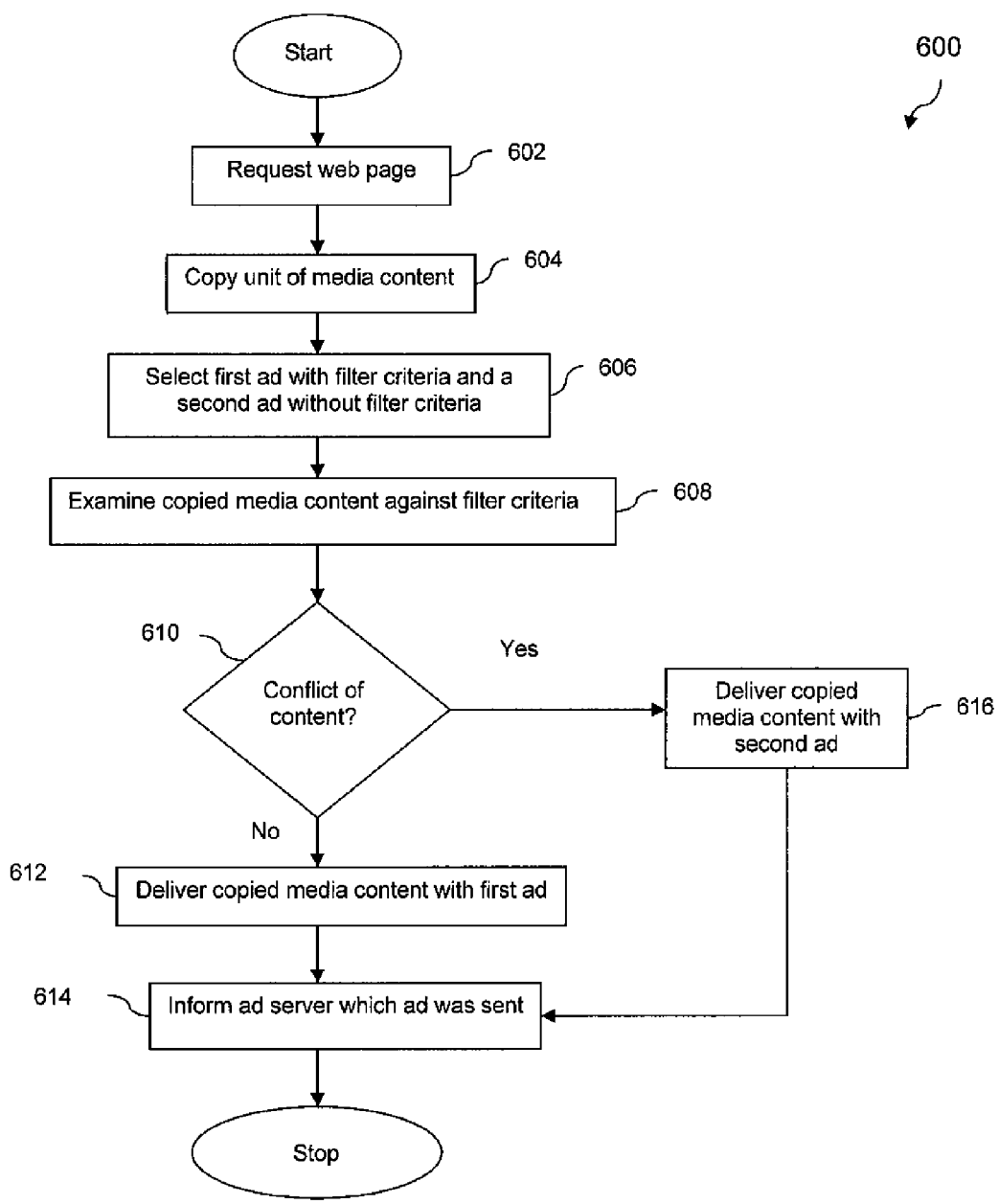
FIG. 6 is a flow chart of another method of delivering advertisements according to an embodiment of the disclosure.

Turning now to FIG. 6, a method 600 of delivering advertisements with media content using context based filtering is described. The method 600 begins at block 602 where the browser 104 on the computer 102 is used to request a web page, through the mobile access gateway 110, from the website publisher 130. In block 604, a unit of media content is copied from the web page. In block 606, the ad server 140 selects both a first advertisement and a second advertisement from the advertisement database 146. In an embodiment, the first advertisement may contain a set of campaign rules set up in the campaign rules database 114 or 144 that restrict the first advertisement from being embedded in any web pages that contain objectionable content (e.g., moral content, product content, competitor content, and political content). For example, a political campaign may not want their advertisements to be presented in the context of a web page that contains pornography and may be willing to pay more to the ad server 140 if restrictions can be placed on where their advertisements appear. In another embodiment, the second advertisement may not contain any restrictions and can be used anytime the first advertisement has a conflict with the web page content. The advertiser associated with the second advertisement may pay a lower advertising fee since no filtering is required before attaching the advertisement to the web page.

In block 608, the filter and replacement application 112, 132, 142 may analyze the copied unit of media content for specific keywords and compare the results to the campaign rules set up for the first advertisement in the campaign rules database 114 or 144. In block 610, it is determined if the copy of the media content conflicts with any rules established for the advertisement. If in block 610, the filter and replacement application 112, 132, 142 does not find any data in the copied unit of media content that conflicts with the filtering restrictions for the first advertisement campaign, the method moves to block 612 where the first advertisement is stitched into the copy of media content and delivered to the browser 104.

If in block 610, the filter and replacement application 112, 132, 142 determines that the copy of media content contains keywords that conflict with the campaign rules set up for the first advertisement (e.g., the advertiser does not want to advertise on a competitor's website), the method 600 moves to block 616 where the second advertisement is available and can be stitched into the copy of media content and delivered to the browser 104. By obtaining both the first advertisement and the second advertisement at the same time, the turnaround time for delivering the copy of the web page may be reduced since there is no delay in obtaining the second advertisement when the first advertisement is rejected. In block 614, the ad server 140 may be notified of which advertisement was delivered so that the advertisers can be billed accordingly.

Figure 7:
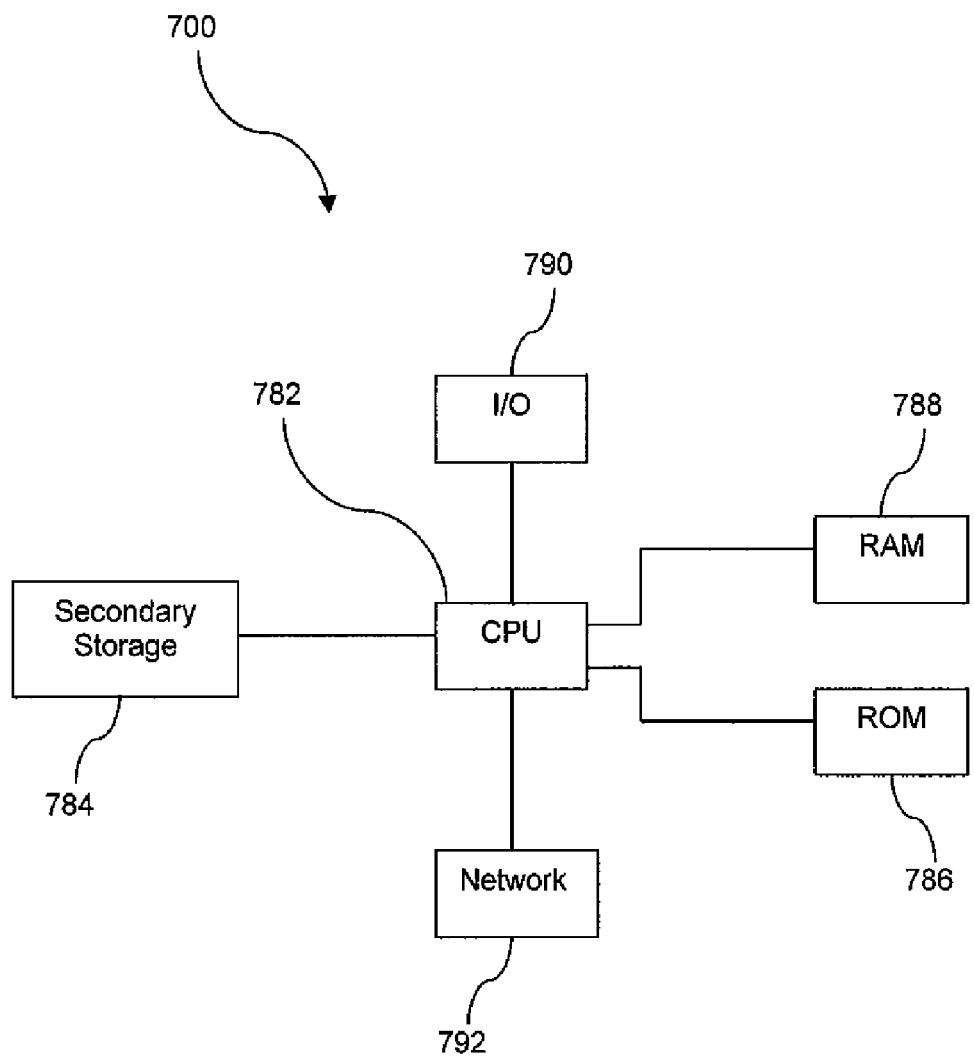
FIG. 7 illustrates an exemplary general purpose computer system suitable for implementing some aspects of the several embodiments of the disclosure.

FIG. 7 illustrates a typical, general-purpose computer system suitable for implementing one or more embodiments disclosed herein. The computer system 700 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embedded in the carrier wave may be sequenced differently as desired for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of delivering advertisements with media content using context based filtering, comprising:
    receiving a copied unit of media content;
    receiving a previously selected first advertisement and a previously selected second advertisement in a single transaction with an advertisement server, wherein the first previously selected advertisement comprises a first advertisement content and a context based filtering criteria, wherein the second previously selected advertisement comprises a second advertisement content, and wherein the context based filtering criteria defines content with which the previously selected first advertisement is not to be displayed with;
    examining, by an application stored on a non-transitory computer readable medium and executable by a processor, the copied unit of media content using the context based filtering criteria;
    determining, by the application, whether the copied unit of media content comprises content that conflicts with the context based filtering criteria based on the examining;
    selecting, by the application, the first advertisement to be delivered with the copied unit of content when no conflict exists;
    selecting, by the application, the second advertisement to be delivered with the copied unit of content when a conflict exists; and
    delivering the copied unit of media content with the selected advertisement.

2. The method of claim 1, wherein the examining comprises searching the copied unit of media content for a keyword identified in the context based filtering criteria and wherein finding the keyword in the copied unit of media content comprises a conflict.

3. The method of claim 1, wherein the copied unit of media content is a first file comprising one of a hyper-text markup language (HTML) file, a wireless markup language file, a handheld device markup language file, and an extensible markup language file.

4. The method of claim 1, wherein the context based filtering criteria is related to at least one of moral content, product content, competitor content, and political content.

5. The method of claim 1, wherein the previously selected second advertisement is not associated with any context based filtering criteria.

6. The method of claim 1, further including transmitting a message to the advertisement server identifying one of the previously selected first advertisement and the previously selected second advertisement was delivered with the copied unit of media content.

7. The method of claim 1, wherein a higher placement purchase cost is associated with the previously selected first advertisement than with the previously selected second advertisement.

8. A system for delivering advertisements with media content using context based filtering, comprising:
    a computer system; and
    an application that, when executed on the computer system,
        receives a copied unit of media content,
        receives a previously selected first advertisement and a previously selected second advertisement in a single transaction with an advertisement server, wherein the first previously selected advertisement comprises a first advertisement content and a context based filtering criteria, wherein the second previously selected advertisement comprises a second advertisement content, and wherein the context based filtering criteria defines content with which the previously selected first advertisement is not to be displayed with,
        examines the copied unit of media content using the context based filtering criteria,
        determines whether the copied unit of media content comprises content that conflicts with the context based filtering criteria based on the examining,
        selects the first advertisement to be delivered with the copied unit of content when no conflict exists,
        selects the second advertisement to be delivered with the copied unit of content when a conflict exists, and
        delivers the copied unit of media content with the selected advertisement.

9. The system of claim 8, further comprising a media access gateway application that, when executed on the computer system, provides media access gateway functionality.

10. The system of claim 9, wherein the media access gateway application provides media access gateway functionality to mobile communication devices.

11. The system of claim 8, wherein when the media content violates the advertisement campaign rules, the application further sends a notification that the advertisement was removed from the page to an advertisement server that provided the advertisement.

12. The system of claim 8, wherein the advertisement campaign rules database comprises a plurality of entries, each entry comprising an advertisement campaign rule coupled to one of an advertisement identifier and an advertiser identifier.

13. The system of claim 12, wherein the application retrieves the advertisement campaign rule based on one of an advertisement identifier and an advertiser identifier coupled to the advertisement as metadata.

14. The system of claim 8, wherein the webpage is received in hyper-text markup language file format.

15. The system of claim 8, wherein the advertisement has been previously selected.

16. The system of claim 8, wherein the advertisement campaign rules define content with which the advertisement is not to be displayed with.

17. The method of claim 1, further comprising when the copied unit of media content is delivered with the second advertisement, transmitting a message to an ad server informing the ad server that the first advertisement was suppressed.

* * * * *